(12) United States Patent
Nemoto et al.

(10) Patent No.: US 7,245,469 B2
(45) Date of Patent: Jul. 17, 2007

(54) DC BACKUP POWER SUPPLY DEVICE AND METHOD FOR DIAGNOSING THE SAME

(75) Inventors: Minehiro Nemoto, Hitachi (JP);
Akihiko Kanouda, Hitachinaka (JP);
Fumikazu Takahashi, Hitachi (JP);
Masahiro Hamaogi, Odawara (JP);
Yoshihide Takahashi, Odawara (JP);
Takashi Tanabe, Nakai (JP); Takao Gotou, Kawasaki (JP); Masato Isogai, Mito (JP); Toshikatsu Miyata, Suita (JP)

(73) Assignees: Hitachi, Ltd., Tokyo (JP); Hitachi Maxell, Ltd., Ibaraki-Shi (JP); Hitachi Computer Peripherals Co., Ltd., Ashigarakami-Gun, Kanagawa-Ken (JP)

( * ) Notice: Subject to any disclaimer, the term of this patent is extended or adjusted under 35 U.S.C. 154(b) by 453 days.

(21) Appl. No.: 10/412,319

(22) Filed: Apr. 14, 2003

(65) Prior Publication Data
US 2003/0231009 A1    Dec. 18, 2003

(30) Foreign Application Priority Data
Apr. 16, 2002    (JP)    ............... 2002-113117

(51) Int. Cl.
*H02H 3/00*    (2006.01)
*H02H 7/00*    (2006.01)
*H02J 7/00*    (2006.01)
*H02J 9/00*    (2006.01)
*H02J 3/00*    (2006.01)
*H02H 9/00*    (2006.01)

(52) U.S. Cl. .......................... 361/65; 307/66; 307/80; 307/82; 307/86; 361/18; 361/79; 361/93.1

(58) Field of Classification Search ................. 361/65, 361/18, 79, 93.1, 78; 307/66, 80, 82, 86, 307/43, 64, 85
See application file for complete search history.

(56) References Cited

U.S. PATENT DOCUMENTS 5,019,717 A    5/1991    McCurry et al. ............. 307/66

(Continued)

FOREIGN PATENT DOCUMENTS

JP    1-96743    4/1989

(Continued)

OTHER PUBLICATIONS

"A New Backup Power Supply with a Battery Deterioration Test Circuit", Kazuhiko Takeno, IEEE, 1995.

(Continued)

*Primary Examiner*—Robert L. Deberadinis
*Assistant Examiner*—Hal I. Kaplan
(74) *Attorney, Agent, or Firm*—Antonelli, Terry, Stout & Kraus, LLP.

(57) ABSTRACT

A reliable uninterruptible DC power supply device. The DC backup power supply device includes an AC/DC converter, a DC/DC converter, voltage step-up/down choppers and a battery connected to a DC path of a main circuit connected with a load via a switch, and a microcomputer. In the device, under control of the microcomputer, the voltage step-up/down choppers are first operated under a condition that the MOS FET was turned OFF for self diagnosis of the backup power supply device. Next, the switch is turned ON to execute the remaining self diagnosis. The DC backup power supply device can execute its self diagnosis with a reduced likelihood of danger of exerting an adverse effect on the main circuit and also can exhibit a reliable uninterruptible power supply function.

5 Claims, 8 Drawing Sheets

U.S. PATENT DOCUMENTS

| | | | |
|---|---|---|---|
| 5,458,991 A | 10/1995 | Severinsky | 429/61 |
| 5,548,463 A | 8/1996 | Aldridge et al. | 361/18 |
| 6,057,609 A * | 5/2000 | Nagai et al. | 307/66 |
| 6,795,322 B2 * | 9/2004 | Aihara et al. | 363/37 |
| 2002/0071292 A1 | 6/2002 | Alhara et al. | |
| 2002/0186576 A1 * | 12/2002 | Kanouda et al. | 363/125 |
| 2003/0222618 A1 | 12/2003 | Kanouda et al. | 320/116 |
| 2005/0146223 A1 | 7/2005 | Kanouda et al. | 307/66 |
| 2005/0206242 A1 | 9/2005 | Kanouda et al. | 307/66 |

FOREIGN PATENT DOCUMENTS

| | | |
|---|---|---|
| JP | 09-061482 | 3/1997 |
| JP | 2000-197347 A1 | 7/2000 |
| JP | 2003-309934 A1 | 10/2003 |
| JP | 2003-309935 A1 | 10/2003 |

OTHER PUBLICATIONS

Communication from European Patent Office dated Dec. 11, 2006.

* cited by examiner

US 7,245,469 B2

DC BACKUP POWER SUPPLY DEVICE AND METHOD FOR DIAGNOSING THE SAME

CROSS-REFERENCE TO RELATED APPLICATIONS

The present application is relevant to U.S. patent application Ser. No. 11/130,123 being filed by Akihiko Kanouda, Minehiro Nemoto, Fumikazu Takahashi, Masahiro Hamaogi, Yoshihide Takahashi, Takashi Tanabe, Takao Gotou, Masato Isogai, Toshikatsu Miyata, and assigned to the present assignees, based on Japanese Patent Application No. 2002-113116 filed on Apr. 16, 2002. The contents of the application are incorporated herein by reference.

BACKGROUND OF THE INVENTION

The present invention relates to a DC backup power supply device and more particularly, to an improvement in a DC backup power supply device including a charging/discharging circuit for performing its power charging/discharging operation between a battery and a DC path and also to a method for diagnosing the device.

In a communication or information device such as a server, router or display array device; an AC/DC converter receives a commercial AC voltage, converts the AC voltage to a desired DC voltage required by a load within the device, and supplies the DC voltage power thereto. In particular, in a device such as a communication or information device which is required to have a high reliability, for the purpose of increasing the reliability of a power supply within the device, it is general to drive the AC/DC converter in a parallel redundant manner. In order to increase a reliability to the commercial AC power input, further, such a means is also employed as to receive a two-channel AC power as the input of the AC/DC converter. To realize a high reliability to the commercial AC power input, furthermore, there is employed such a power supply arrangement that an uninterruptible power supply (abbreviated to UPS, hereinafter) is connected between the device and the commercial AC voltage.

A DC backup power supply for supplying a DC power to a load from an AC power source via AC/DC and DC/DC converters is known as disclosed in JP-A-2000-197347. In this Publication, it is proposed to increase a conversion efficiency and reduce its volume and cost by connecting an intermediate DC path between the converters to a DC backup power supply.

The above related technique had a problem that no consideration is paid to an abnormality in parts within the DC backup power supply, resulting in a lack of reliability.

SUMMARY OF THE INVENTION

It is therefore an object of the present invention to provide a DC backup power supply device which can supply a DC power to a load with a high reliability, and also provide a method for diagnosing the device.

In accordance with an aspect of the present invention, there is provided a DC backup power supply device which includes an AC/DC converter for converting an AC power to a DC power, a DC/DC converter for receiving the DC power as an output of the AC/DC converter and supplying it to a load while controlling its voltage, a bi-directional DC/DC converter connected to a DC path between the converters via a switch, and a DC power storage connected to the bi-directional DC/DC converter. The backup power supply device further includes a current detector and/or a voltage detector and a circuit for monitoring an abnormality in the DC backup power supply device on the basis of an output of the detector within the DC backup power supply device.

With such an arrangement, there can be realized a DC backup power supply device which has a uninterruptible power supply function and a high reliability.

In accordance with another aspect of the present invention, there is provided a DC backup power supply device which includes circuitry for diagnosing an abnormality in the DC backup power supply device under such a condition that the switch between the DC path of a main circuit and the DC backup power supply device is turned OFF and circuitry for diagnosing an abnormality in the DC backup power supply device under such a condition that the switch is turned ON thereafter.

With such an arrangement, the diagnosis of each part of the DC backup power supply device can be carried out while lessening the likelihood of danger that the main circuit is adversely influenced.

Other objects and advantages of the present invention will become clear as the following description of the invention advances with reference to preferred embodiments of the invention in conjunction with the accompanying drawings, wherein like reference numerals refer to the same parts throughout the specification.

DESCRIPTION OF THE EMBODIMENTS

Figure 1:
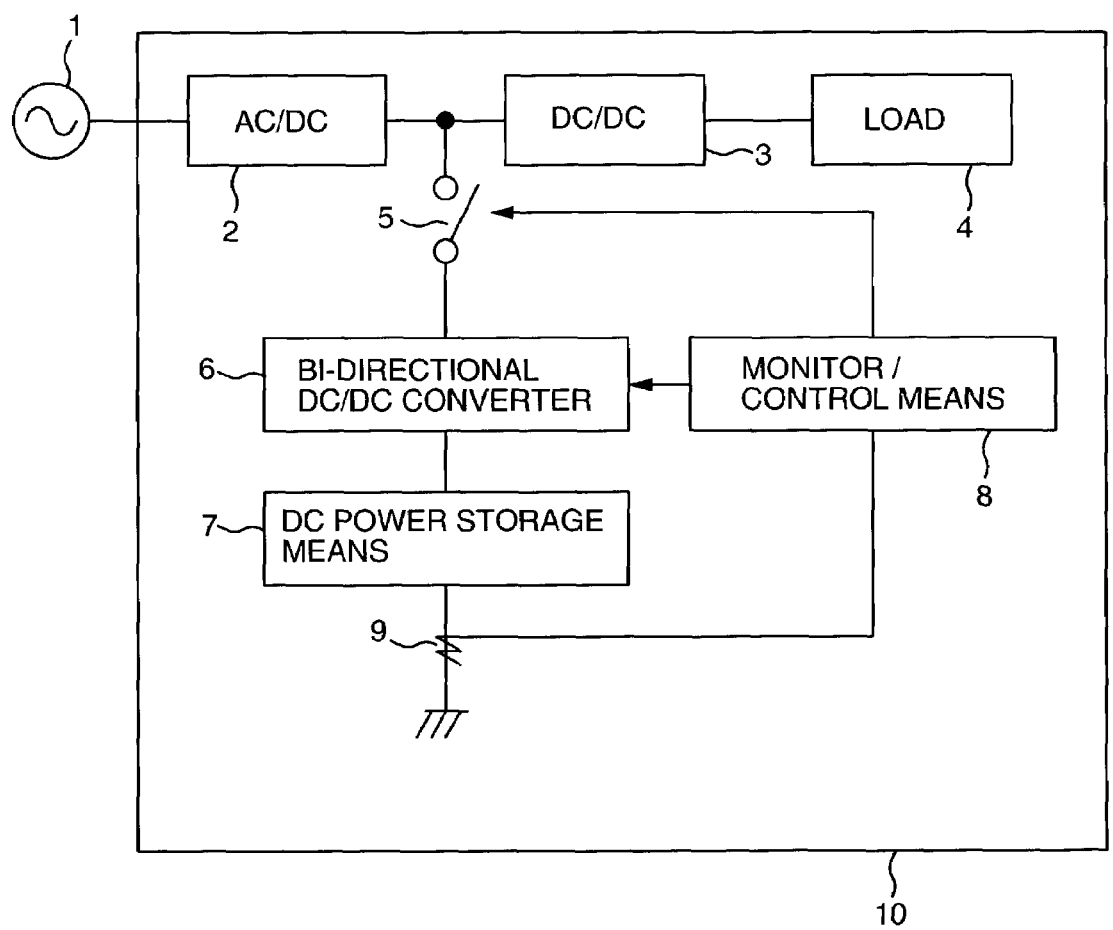
FIG. 1 is a block diagram of a DC backup power supply device in accordance with an embodiment of the present invention.

FIG. 1 shows a block diagram of a DC backup power supply device in accordance with a first embodiment of the present invention. A power from a commercial AC power source 1 is converted to a DC power by an AC/DC converter 2 provided within an electric apparatus 10. The DC power is input to a DC/DC converter 3, having a voltage control function to be supplied to a load 4, forming a main circuit. A DC backup power supply device includes, as major constituent elements, a bi-directional DC/DC converter 6 connected to a DC path between the converters of the main circuit via a switch 5 and a DC power storage 7 such as a secondary battery. For the purpose of controlling the switch 5 and bi-directional DC/DC converter 6, a monitor/control 8 is provided to input an electrical signal from a circuit 9 or the like for detecting a charging/discharging current of the DC power storage 7 and to monitor and control the charging or discharging of the DC power storage 7.

Figure 2:
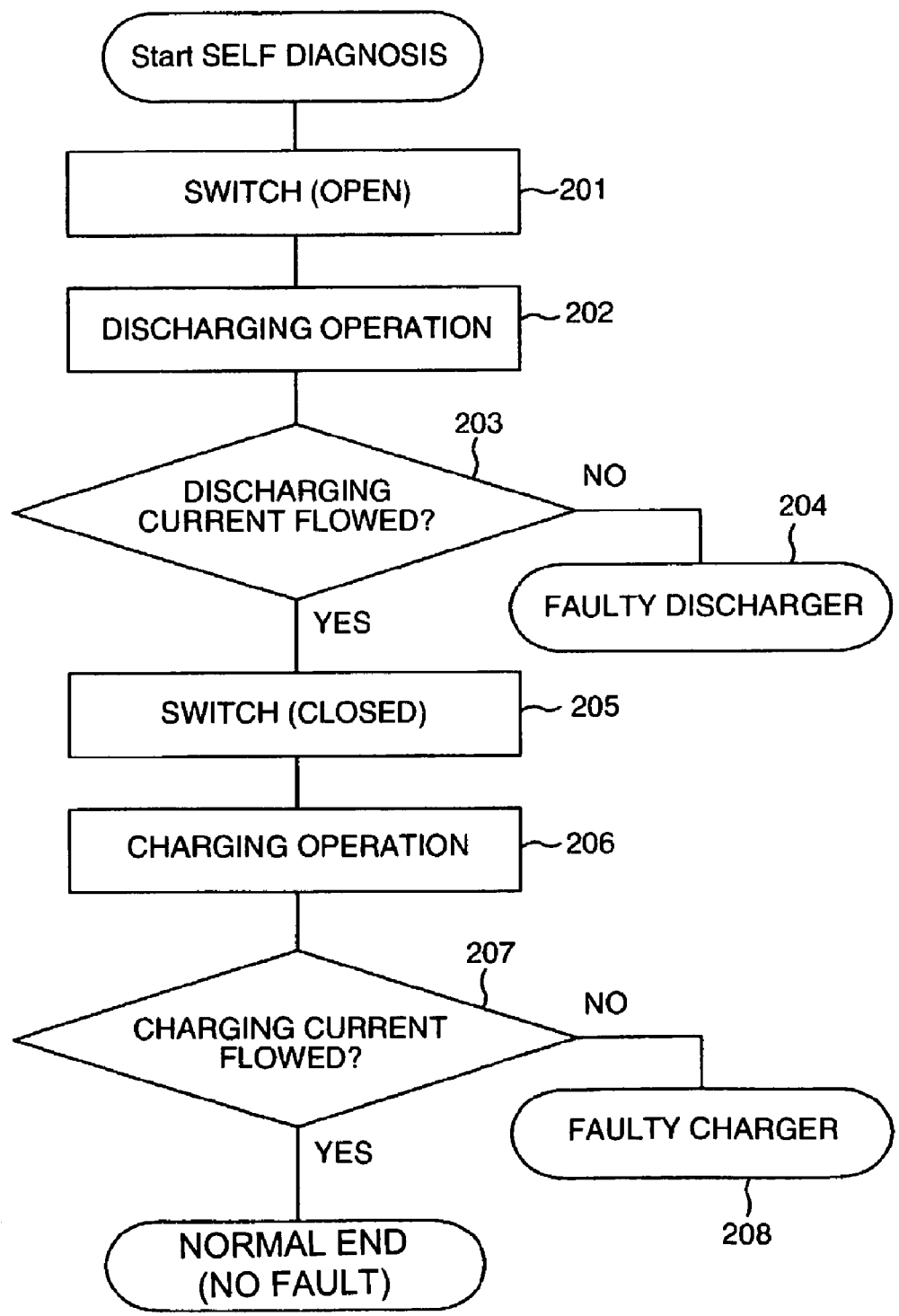
FIG. 2 is a first embodiment of a processing flowchart of a self diagnosis procedure in the present invention.

FIG. 2 is a processing flowchart of a self-diagnosis procedure in the embodiment of FIG. 1. The embodiment is featured by the fact that the DC backup power supply detects and diagnoses its own fault. Explanation will first be made as to its self diagnosis procedure with use of FIGS. 1 and 2. First of all, in step 201, the switch 5 is turned OFF to separate the DC backup power supply device from the main circuit. In a step 202, next, the bi-directional DC/DC converter 6 is controlled on the basis on a command from the monitor/control circuit 8 to perform a discharging operation from the DC power storage 7 to a smoothing capacitor (to be explained later) of the bi-directional DC/DC converter 6 connected to the side of the switching 5. At this time, in step 203, the device judges whether or not a discharging current flowed. When the discharging current did not flow at all, the device determines in step 204 that a discharger in the bi-directional DC/DC converter 6 became faulty. That is, of voltage step-up and step-down choppers, the voltage step-up chopper is faulty.

If the device recognizes that the discharging current flowed in the step 203, then the device judges that the discharger is normal and the backup power supply device can be connected to the main circuit without any problems. Thus in the next step 205, the device turns ON the switch 5 to connect the DC backup power supply device to the main circuit. Next, the device controls the bi-directional DC/DC converter 6 on the basis of a command from the monitor/control circuit 8 in step 206 to perform a charging operation over the DC power storage 7 from the main circuit. In step 207, the monitor/control circuit 8 judges whether or not a charging current flowed using an output of the circuit 9. When the charging current did not flow at all, the device determines in step 208 that a charger in the bi-directional DC/DC converter 6 became faulty.

Through such a series of operations as mentioned above, the self diagnosis of the DC backup power supply device is completed. When the device detects an abnormality on its own through the self diagnosis, the device records the abnormality location, turns OFF the switch 5 or inhibits turning ON the switch, and issues an alarm signal from an alarm device and/or lamp. The device is arranged so that the user when having recognized the alarm or lamp signal can recognize the abnormality location from the above record.

In accordance with the embodiment, there can be realized a power supply device which can supply a DC power to a load with a high reliability and can have a self diagnosis function. Because the self diagnosis is carried out after the device is separated from the main circuit, the DC backup power supply device can diagnose each part in the device with less possible danger to the main circuit.

Figure 3:
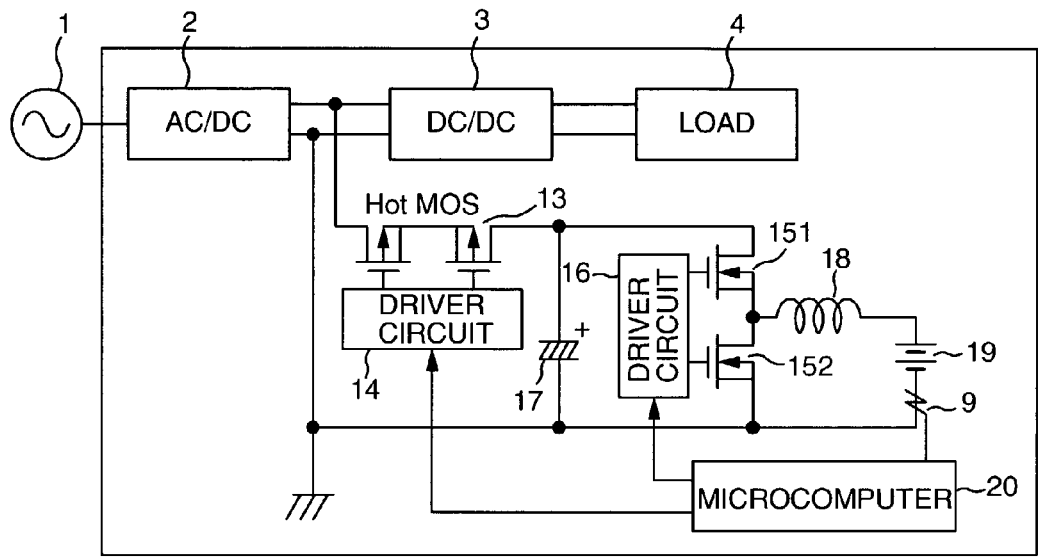
FIG. 3 is a first embodiment of a specific circuit of the DC backup power supply device in accordance with the present invention.

FIG. 3 shows a first embodiment of a specific circuit of the DC backup power supply device in accordance with the present invention. In this case, the switch 5 in FIG. 1 is implemented with an MOS FETs 13 called a 'hot MOS' and a MOS FET driver circuit 14, while the monitor/control circuit 8 is implemented with use of, e.g., a microcomputer 20. The bi-directional DC/DC converter 6 comprises a voltage step-up/down chopper circuit which includes MOS FET's 151 and 152 for controlling the charging and discharging operation, a MOS FET driver circuit 16, a smoothing capacitor 17, and a reactor 18. In other words, the MOS FET 151 is a major constituent element of the voltage step-down chopper as a charger for charging a battery 19, whereas, the MOS FET 152 is a major constituent element of the step-up chopper as a discharger for discharging the battery 19. Further, the battery 19 as the DC power storage 7 can employ a general secondary battery. However, when a Ni-Cd battery, a Ni-MH battery or a lithium battery higher in energy density than a lead battery is used, the device can be made smaller in size.

With such an arrangement, under a command from the microcomputer 20, not only the monitor/control of the charging/discharging operation of the battery 19 but also the self diagnosis mentioned in FIG. 2 can be realized.

Figure 4:
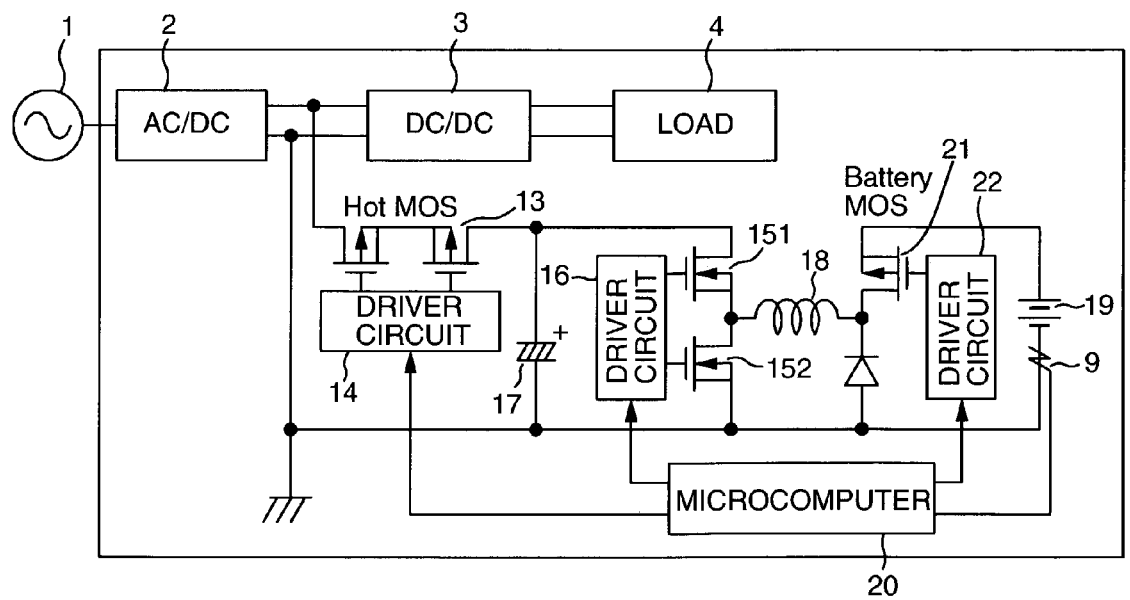
FIG. 4 is a second embodiment of the specific circuit of the DC backup power supply device in accordance with the present invention.

FIG. 4 shows a second embodiment of a specific circuit of the DC backup power supply device in accordance with the present invention. In this embodiment, in addition to the embodiment of FIG. 3, a second switch (battery MOS FET) 21 is provided between the bi-directional DC/DC converter and the battery 19 to be connected with a driver circuit 22 for driving the second switch and to be controlled by the microcomputer 20.

With the present arrangement, since the battery MOS FET 21 is turned ON/OFF controllably under control of the microcomputer 20, an excessive current caused by an abnormality or the like in the voltage step-up/down choppers can be prevented from flowing through the battery 19. For example, when a short-circuiting occurs in the smoothing capacitor 17 or in the MOS FET 151, by turning OFF the second switch (battery MOS FET) 21, the circuit can be prevented from being damaged by the excessive current from the battery 19.

Figure 5:
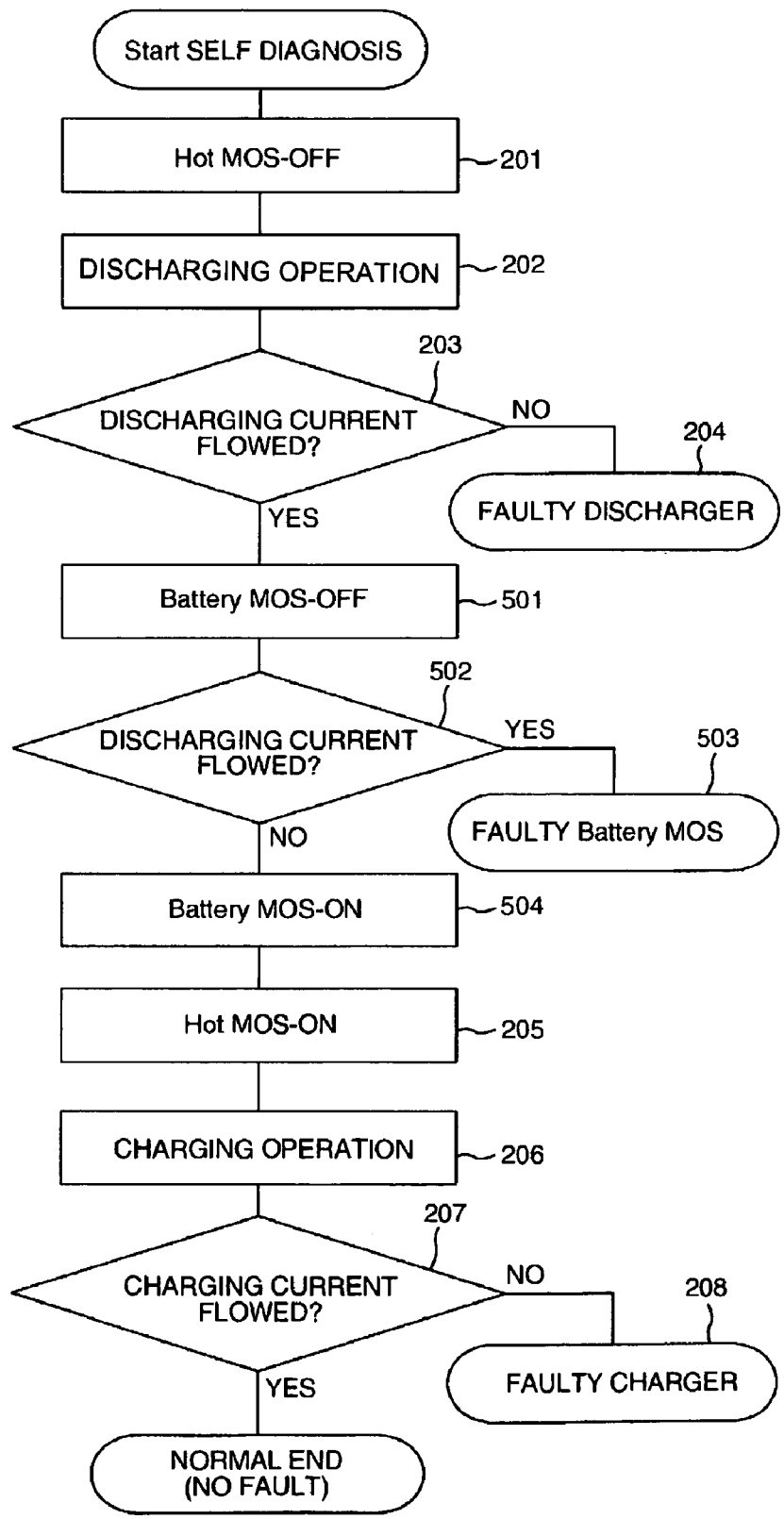
FIG. 5 is a second embodiment of the processing flowchart of the self diagnosis procedure in the present invention.

FIG. 5 is a second embodiment of a processing flowchart of a self diagnosis procedure in the present invention. Explanation will be made as to the self diagnosis procedure with use of FIGS. 4 and 5. The present embodiment is different from that of FIG. 2 in that procedures 501 to 504 for detecting an abnormality in the second switch 21 under a condition that the first switch (hot MOS) MOS FET 13 is turned OFF. Accordingly, the DC backup power supply device increases the number of items to be self diagnosed independently of the main circuit.

The steps 201 to 204 are the same as those in FIG. 2. In next step 501, the battery MOS FET 21 is turned OFF to cause the discharging operation. And the device or microcomputer judges in a step 502 whether or not a discharging current flowed. When the discharging current flowed, the control is shifted to the step 503 and the device determines that the battery MOS FET 21 is short-circuited as a fault. In a next step 504, the device turns ON the battery MOS FET 21.

When all the above self diagnosis are complete, the device executes the same procedure as the steps 205 to 208 in FIG. 2 and performs a diagnosis under a condition that the device is connected to the main circuit. Through such a series of operations, the self diagnosis is completed.

Figure 6:
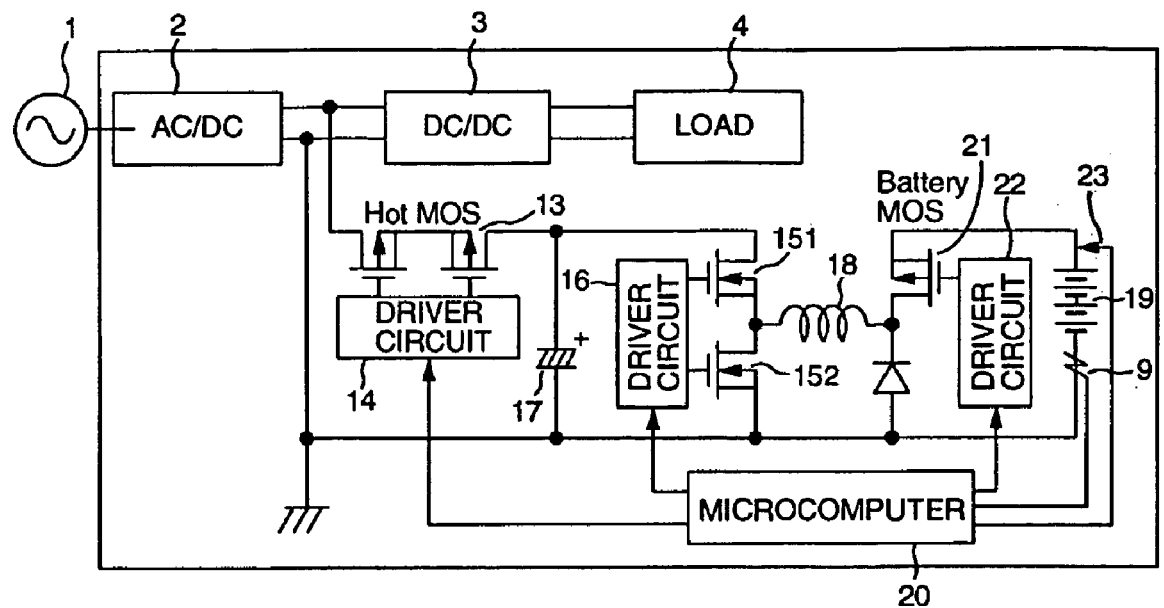
FIG. 6 is a third embodiment of the specific circuit of the DC backup power supply device in accordance with the present invention.

FIG. 6 is a third embodiment of a specific circuit of the DC backup power supply device according to the present invention. The present embodiment is different from the embodiment of FIG. 4 in that a circuit 23 for detecting a total voltage (voltage across both terminals) of the battery 19 is provided and the detected voltage is applied to the microcomputer 20. With the present arrangement, upon diagnosis, the device can measure not only the charging/discharging currents of the battery in its charging, discharging and standby modes, but also the voltage of the battery. As a result, the device can measure an internal resistance r of the battery according to an equation which follows with use of three types of measured data: a battery voltage Vo prior to charging operation, a battery voltage Vc after the charging operation and a charging current Ic.

$r=(Vc-Vo)/Ic$

When the internal resistance of the battery is measured in this way, the deterioration diagnosis of the battery can be realized. In the case of an Ni-MH battery, for example, the advanced deterioration of the battery causes the internal resistance to increase, so that battery life diagnosis criteria estimated from acceleration tests are previously provided. And when an internal resistance higher than a prescribed value is measured, the device determines that the battery reached the end of its useful life and the device can report to the user that the battery should be exchanged.

Figure 7:
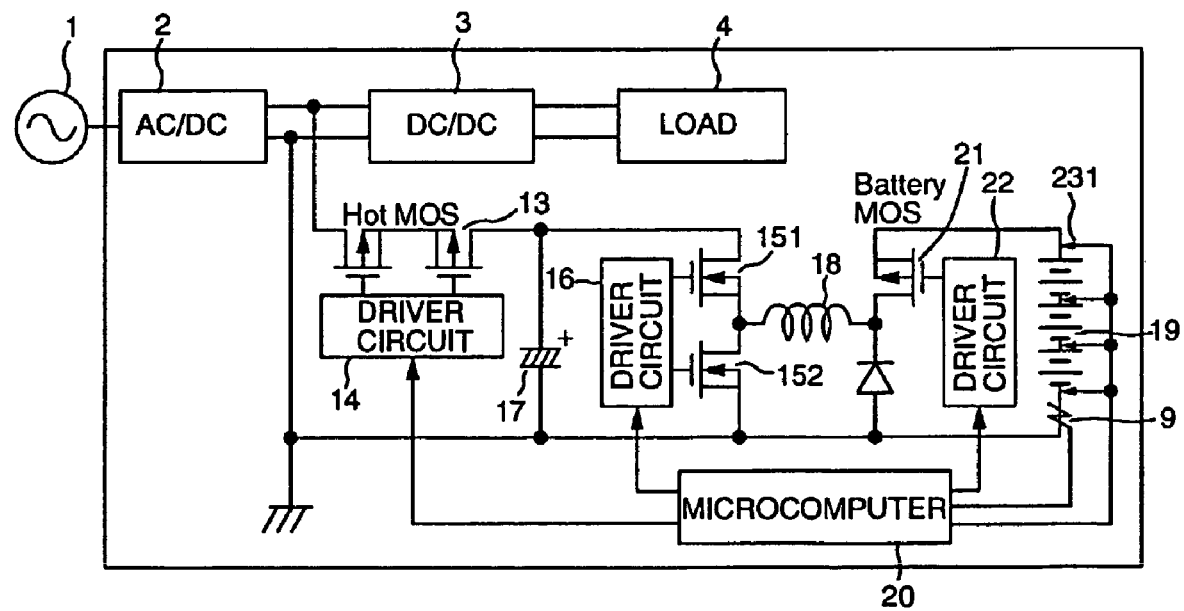
FIG. 7 is a fourth embodiment of the specific circuit of the DC backup power supply device in accordance with the present invention.

FIG. 7 is a fourth embodiment of a specific circuit of the DC backup power supply device in accordance with the present invention. The present embodiment is different from the embodiment of FIG. 6 in that a voltage detecting circuit 231 for the battery 19 is arranged to measure voltages at a plurality of connection points of the battery. With the present arrangement, the device can measure not only the total voltage of the battery 19 but also intermediate voltages of battery cells connected in series. As a result, when, e.g., 20 cells are connected in series as the battery 19, a short-circuit of the battery and a short-circuiting of each cell can be measured by connecting voltage detecting terminals for each cell, and thus a fault in each cell of the battery 19 can be detected. When one voltage detecting circuit is connected for each module of four series-connected cells in the battery 19 of, e.g., 20 cells connected in series, only five voltage detection circuits are required, though 20 voltage detection circuits have been required when detection circuit is connected to each cell. In this case, since a voltage obtained by dividing a voltage across each battery cell module of 4 series-connected cells by 4 is regarded as a voltage per cell, the detection accuracy of a faulty cell becomes low, but the number of such detection circuits can be largely reduced and its cost can be made advantageously low.

Figure 8:
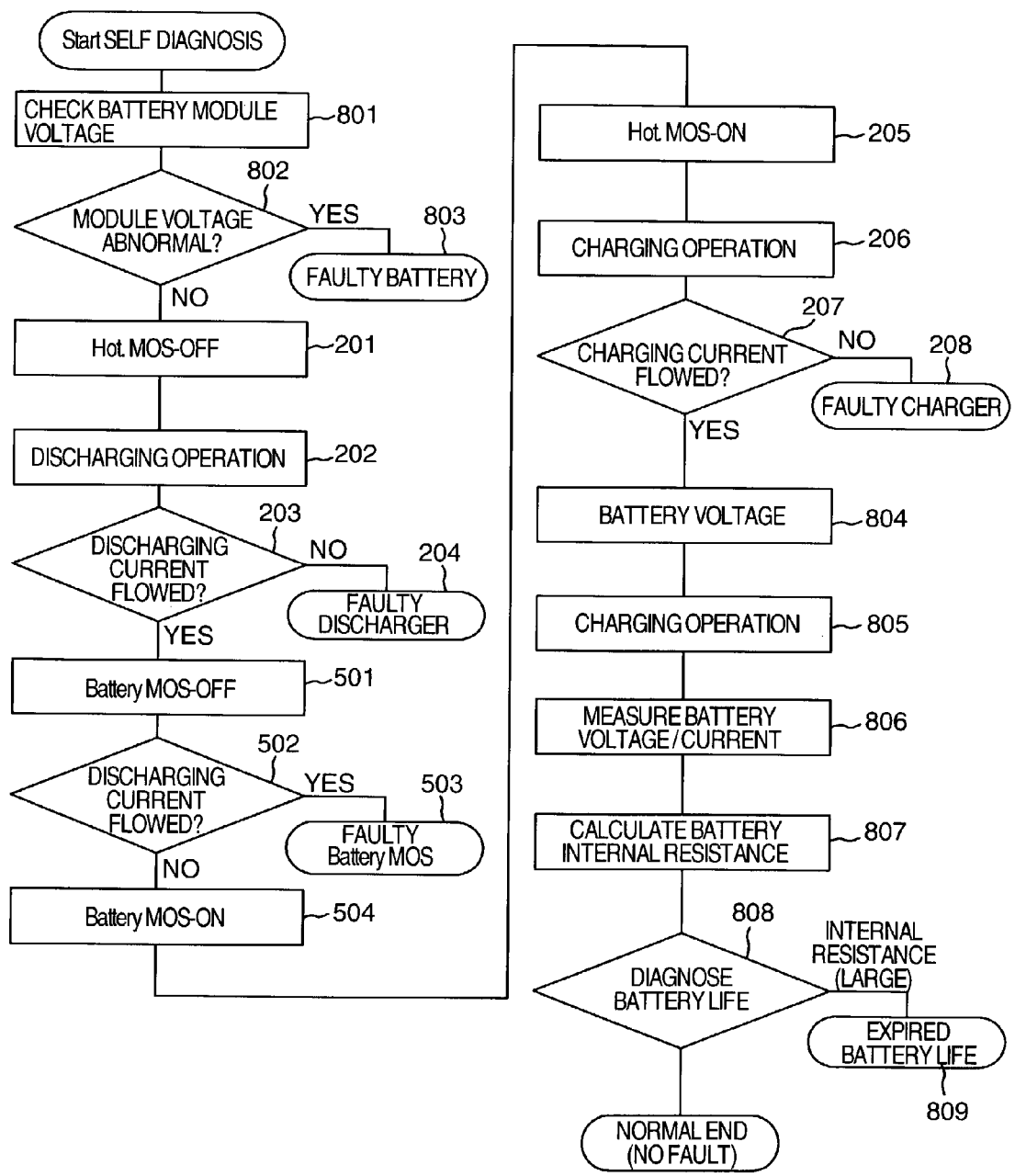
FIG. 8 is a third embodiment of the processing flowchart of the self diagnosis procedure in the present invention.

FIG. 8 is a third embodiment of a processing flowchart of the self diagnosis procedure in accordance with the present invention. Explanation will be made as to the self diagnosis procedure with use of FIGS. 7 and 8. The present embodiment is different from that of FIG. 5 in that steps 801 to 803 and steps 804 and 809 are added, which will be detailed later. In step 801, first of all, the device detects a voltage across a battery module with use of the voltage detecting circuit 231, judges in step 802 the presence or absence of an abnormality in the voltage of each battery module, and detects in step 803 a fault in cells in each battery module.

Steps 201 to 208 are the same as those in FIG. 5 and thus double explanation thereof is omitted. In step 804, the device detects a battery voltage before the device is charged, and performs in step 805 its charging operation from the main circuit to the battery 19 through the operation of the voltage step-down chopper. In next step 806, the device measures a charging current in a battery charge mode and a battery voltage after the device is charged. On the basis of these measured data, the device calculates an internal resistance of the battery 19 in step 807. In step 808, the device diagnose the life of the battery 19 depending on whether or not the calculated internal resistance of the battery 19 is higher than a specified internal resistance value. When the calculated internal resistance is higher than the specified value, the device determines in step 809 that the battery 19 reached the end of its useful life. In this case, the device reports to the user that the battery should be exchanged. Through such a series of operations, the self diagnosis can be realized.

Figure 9:
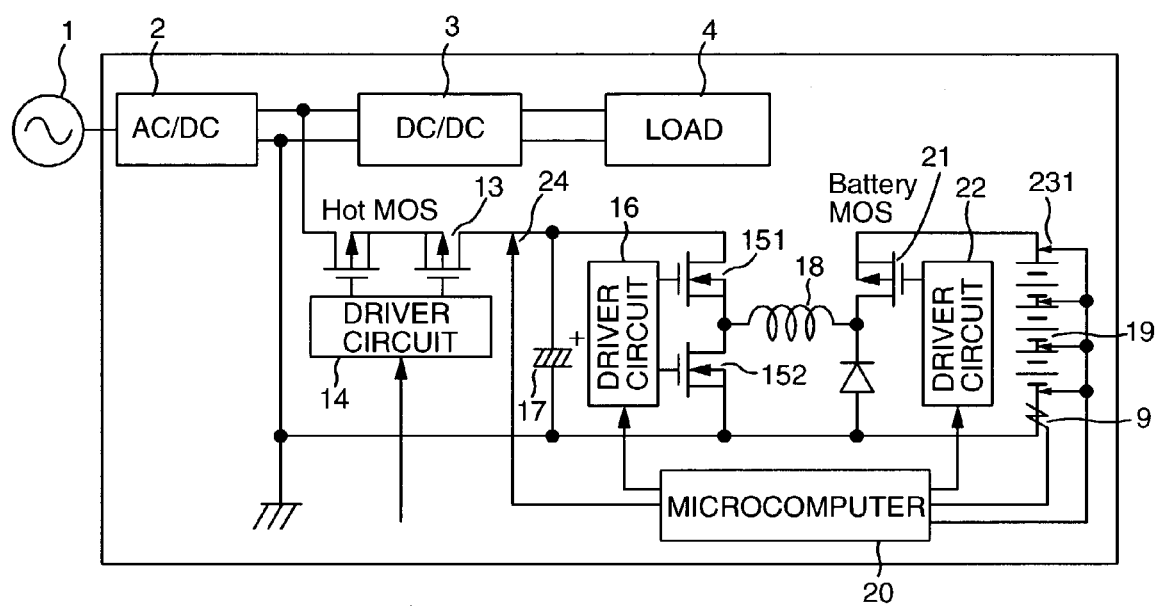
FIG. 9 is a fifth embodiment of the specific circuit of the DC backup power supply device in accordance with the present invention.

FIG. 9 is a fifth embodiment of a specific circuit of the DC backup power supply device in accordance with the present invention. The present embodiment is different from the embodiment of FIG. 7 in that a circuit 24 for detecting a voltage across the smoothing capacitor 17 was connected. With the present arrangement, the device can detect a fault in the MOS FET 13 as the first switch.

Figure 10:
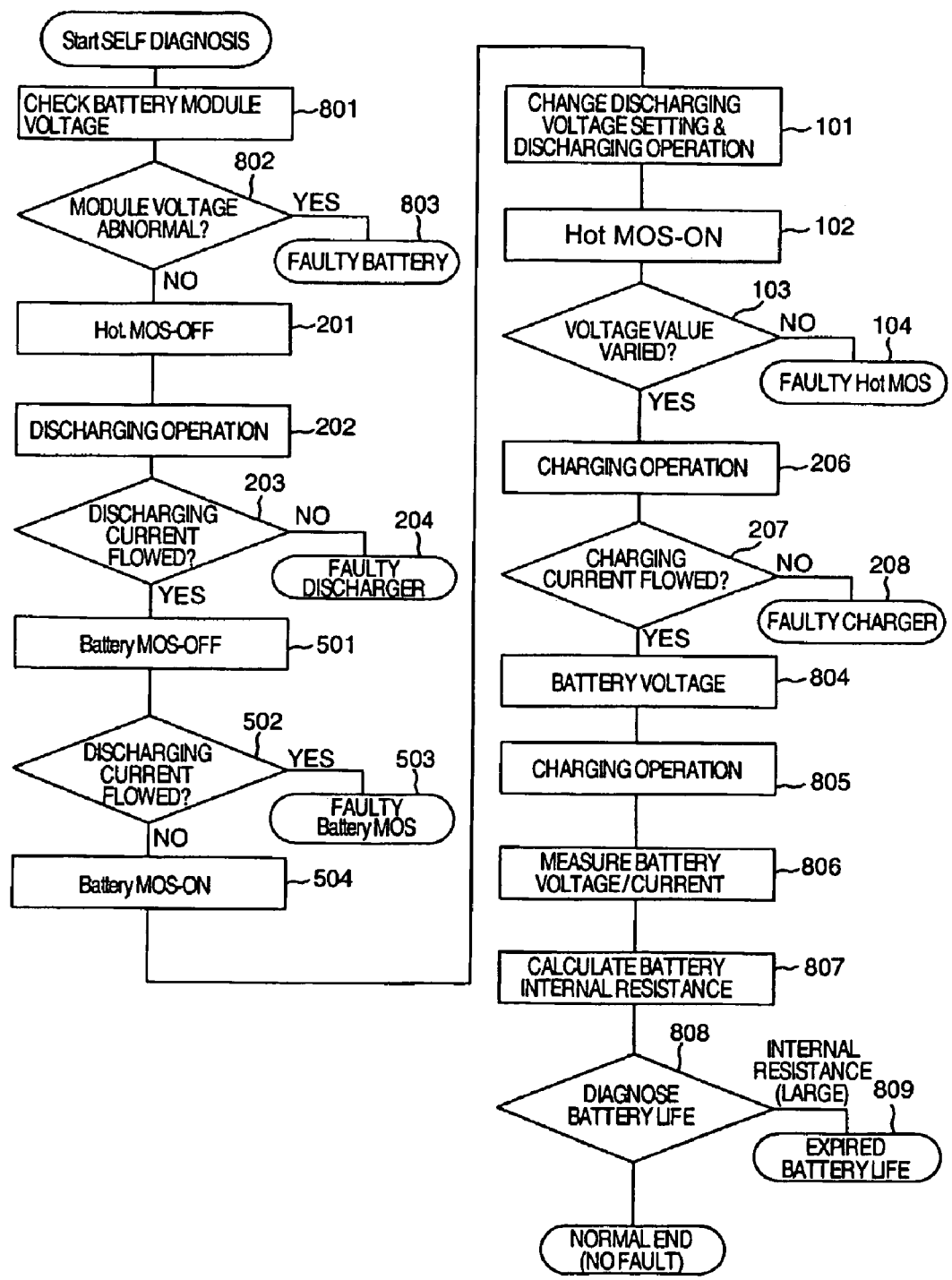
FIG. 10 is a fourth embodiment of the processing flowchart of the self diagnosis procedure in the present invention.

FIG. 10 is a third embodiment of a processing flowchart of the self diagnosis procedure in accordance with the present invention. The present embodiment is different from the embodiment of FIG. 8 in that, in place of the step 205 in FIG. 8, a procedure for detecting a fault in the MOS FET 13 as the first switch, that is, steps 101 to 104, is inserted.

Referring to FIGS. 9 and 10, the procedure for detecting a fault in the MOS FET 13 will be explained. First, the first switch 13 is turned OFF to separate the backup power supply device from the main circuit, under which condition the device controls the bi-directional DC/DC converter with a voltage value different from the DC path of the main circuit as a target. In other words, in step 101, the target value of the discharging voltage to the smoothing capacitor 17 is set to be somewhat higher than the set voltage of the DC path to cause the bi-directional DC/DC converter to be discharged (operated as a voltage step-up chopper). Thereafter, in step 102, the first switch (MOS FET) 13 is turned ON. Through such a series of operations, so long as the MOS FET 13 operates normally, a voltage value detected by the voltage detecting circuit 24 after the MOS FET is turned ON varies from the above discharging-voltage target value to the voltage value of the DC path of the main circuit. When the microcomputer 20 monitors the above voltage change in step 103, the device can detect the present or absence of a fault in the MOS FET 13 in step 104.

In the self diagnosis procedure shown in FIGS. 2, 5, 8 and 10, the order of the battery voltage check, discharging operation, charging operation, battery deterioration diagnosis and MOS FET fault diagnosis is not limited to the illustrate order but may be arbitrarily set. However, as in the foregoing embodiments, the self diagnosis of the backup power supply device is first carried out under a condition that the first switch 5 (FET 13) is turned OFF to confirm its normality. After the normality confirmation, when the self diagnosis of the backup power supply device is carried out under a condition that the first switch 5 (FET 13) is turned ON, the likelihood of danger causing an adverse effect on the main circuit can be lessened.

In accordance with the present invention, there can be realized a DC backup power supply device which can supply a DC power to a load with a high reliability and also can have a self diagnosis function.

Further, when the diagnosis order is determined, the DC backup power supply device can diagnose each part in the device while lessening the likelihood of danger of causing an adverse effect on the main circuit.

It should be further understood by those skilled in the art that although the foregoing description has been made of embodiments of the invention, the invention is not limited thereto and various changes and modifications may be made without departing from the spirit of the invention and the scope of the appended claims.

What is claimed is:

1. A DC backup power supply device comprising:
an AC/DC converter for converting an AC power to a DC power;
a DC/DC converter for receiving the DC output power of the AC/DC converter and controlling a voltage of the received DC output power;
a bi-directional DC/DC converter connected to a DC path of a main circuit between said AC/DC converter and said DC/DC converter via first switching means, said main circuit having a load connected to the DC/DC converter; and
DC power storage means connected to the bi-directional DC/DC converter,
said device further comprising:
    means for detecting a current and/or voltage within the DC backup power supply device; and
    means for monitoring an abnormality in the DC backup power supply device on the basis of an output of the current/voltage detecting means,
wherein a smoothing capacitor is connected to a side of said bi-directional DC/DC converter having the first switching means, and said monitoring means includes means for charging said smoothing capacitor from said DC power storage means through the operation of said bi-directional DC/DC converter, means for turning ON said first switching means after the charging operation, and means for confirming a change in a voltage across said smoothing capacitor before and after the first switching means is turned ON.

2. A DC backup power supply device comprising:
an AC/DC converter for converting an AC power to a DC power;
a DC/DC converter for receiving the DC output power of the AC/DC converter and controlling a voltage of the received DC output power;
a bi-directional DC/DC converter connected to a DC path of a main circuit between said AC/DC converter and said DC/DC converter via first switching means, said main circuit having a load connected to the DC/DC converter; and
DC power storage means connected to the bi-directional DC/DC converter,
said device further comprising:
    means for detecting a current and/or voltage within the DC backup power supply device;
    means for monitoring an abnormality in the DC backup power supply device on the basis of an output of the current/voltage detecting means;
    second switching means connected between said bi-directional DC/DC converter and said DC power storage means;
    means for detecting an abnormality in said bi-directional DC/DC converter; and
    means for turning OFF said second switching means on the basis of operation of said abnormality detecting means.

3. A DC backup power supply device comprising:
an AC/DC converter for converting an AC power to a DC power;
a DC/DC converter for receiving the DC output power of the AC/DC converter and controlling a voltage of the received DC output power;
a bi-directional DC/DC converter connected to a DC path of a main circuit between said AC/DC converter and said DC/DC converter via first switching means, said main circuit having a load connected to the DC/DC converter; and
DC power storage means connected to the bi-directional DC/DC converter,
said device further comprising:
    means for detecting a current and/or voltage within the DC backup power supply device;
    means for monitoring an abnormality in the DC backup power supply device on the basis of an output of the current/voltage detecting means;
    second switching means connected between said bi-directional DC/DC converter and said DC power storage means; and
    means for detecting an abnormality in said second switching means when detecting a current flowing through said DC power storage means under a condition that the second switching means is turned OFF.

4. A DC backup power supply device comprising:
an AC/DC converter for converting an AC power to a DC power;
a DC/DC converter for receiving the DC output power of the AC/DC converter and controlling a voltage of the received DC output power;
a bi-directional DC/DC converter connected to a DC path of a main circuit between said AC/DC converter and said DC/DC converter via first switching means, said main circuit having a load connected to the DC/DC converter; and
DC Power storage means connected to the bi-directional DC/DC converter,
said device further comprising:
    means for detecting a current and/or voltage within the DC backup power supply device;
    means for monitoring an abnormality in the DC backup power supply device on the basis of an output of the current/voltage detecting means;
    means for performing first abnormality diagnosis over a section including said DC power storage means and said bi-directional DC/DC converter within said DC backup power supply device under a condition that said first switching means is turned OFF; and
    means for performing second abnormality diagnosis over a section including said DC power storage means and said bi-directional DC/DC converter within said DC backup power supply device under a condition that said first switching means is turned ON.

5. A method for diagnosing a DC backup power supply device comprising:
an AC/DC converter for converting an AC power to a DC power;
a DC/DC converter for receiving the DC output power of the AC/DC converter and controlling a voltage of the received DC output power;
a bi-directional DC/DC converter connected to a DC path of a main circuit between said AC/DC converter and said DC/DC converter via first switching means, said main circuit having a load connected to the DC/DC converter; and DC power storage means connected to the bi-directional DC/DC converter, said method including steps of:

performing first abnormality diagnosis over said DC backup power supply device under a condition that said first switching means is turned OFF; and when an abnormality is not detected in said first abnormality diagnosis step, turning ON said first switching means to perform second abnormality diagnosis over said DC backup power supply device.

* * * * *